No. 736,956. PATENTED AUG. 25, 1903.
C. G. GARRIGUS & A. A. WARNER.
DOUGH MIXER.
APPLICATION FILED APR. 4, 1903.
NO MODEL.
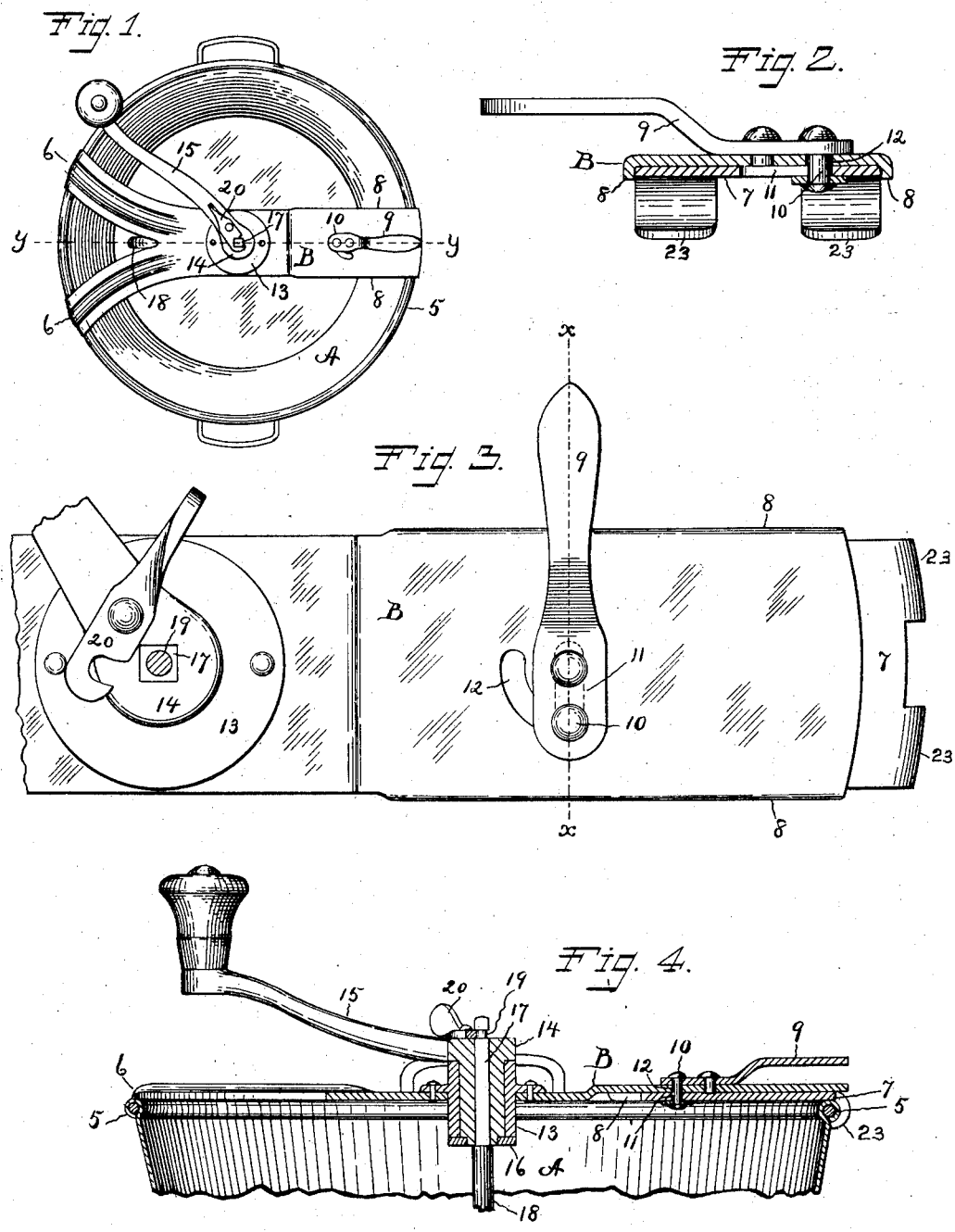
Witnesses.
S. H. Clarke
P. J. Egan
Inventors.
Clarence G. Garrigus
Alonzo A. Warner
By James Shepard Atty.

No. 736,956. Patented August 25, 1903.

UNITED STATES PATENT OFFICE.

CLARENCE G. GARRIGUS AND ALONZO A. WARNER, OF NEW BRITAIN, CONNECTICUT, ASSIGNORS TO CHARLES F. SMITH AND GEORGE M. LANDERS, OF NEW BRITAIN, CONNECTICUT.

DOUGH-MIXER.

SPECIFICATION forming part of Letters Patent No. 736,956, dated August 25, 1903.

Application filed April 4, 1903. Serial No. 151,175. (No model.)

*To all whom it may concern:*

Be it known that we, CLARENCE G. GARRIGUS and ALONZO A. WARNER, citizens of the United States, residing at New Britain, in the county of Hartford and State of Connecticut, have invented certain new and useful Improvements in Dough-Mixers, of which the following is a specification.

Our invention relates to improvements in dough-mixers; and the objects of our improvement are simplicity and economy in construction and convenience and efficiency in use.

In the accompanying drawings, Figure 1 is a plan view of our dough-mixer. Fig. 2 is an enlarged vertical section of a portion of the shaft-bearing bar on the line $x\ x$ of Fig. 3. Fig. 3 is a plan view of a portion of the detachable shaft-bearing bar with the parts in a different position. Fig. 4 is a vertical section on the line $y\ y$ of Fig. 1, enlarged from Fig. 1, but on a smaller scale than Figs. 2 and 3.

Our invention is particularly intended for use in dough-mixers, but is equally applicable to other mixers or agitators in which a shaft-bearing bar or frame is removably connected with the top of the mixing vessel.

A designates the vessel, which may be of any desired shape or size and provided with a rim 5 at its top, to which a shaft-bearing bar may be attached. We form the shaft-bearing bar B or frame preferably of sheet metal, with two somewhat widely separated fixed hooks 6 6 at one end and a sliding hooked plate 7 at its other end. This plate 7 is provided with hooks 23 for engaging the rim 5 of the vessel, the said two hooks being nearer together than are the fixed hooks 6 6, so that they practically form one hook. The hooks 6 6 are spread laterally beyond the side edges of the body of the bar. The edges of the bar near the end are turned down to form guides or ways 8 8, within which the hooked plate slides. A lever 9 is pivoted to the upper face of the bar and provided with a pin 10, that extends through a transverse slot 11, Fig. 2, in the hooked plate, the said slot being indicated by broken lines in Fig. 3. The pin 10 passes through a curved slot 12, whereby the said pin is free to move with the lever 9. A washer is secured to the lower end of the pin 10 to assist in holding the hooked plate in place on the bar B.

When the lever 9 is turned into the position shown in Figs. 2 and 3, the hooked plate 7 is extended or forced outwardly. When in this position, the bar is placed on the top of the vessel with the hooks 6 6 and the hook or hooks of the hooked plate extending downwardly below the rim. The lever 9 is then turned from the position shown in Figs. 2 and 3 to that shown in Figs. 1 and 4, thereby contracting the length of the bar B and drawing all of the hooks firmly into engagement with the rim 5 of the vessel, so as to rigidly secure the bar thereon. The fixed hooks are spread farther apart than the normal width of the bar in order to bring the bar centrally across the vessel, and when the vessel is clamped by the hooks at both ends of the bar preventing the said bar from moving laterally on the vessel.

At the middle portion of the bar B we secure a shaft-bearing 13, within which we mount the tubular shaft 14, which shaft also forms the hub of the crank 15. This hub is flanged at its upper end and is secured within the bearing 13 by a washer 16, riveted on its lower end. The opening through the shaft or hub 14 is angular, and the shank 17 or upper end of the beater 18 is also of the same angular form. (See Fig. 3.) The beater extends down into the vessel and is of any desired form, a portion of the said beater being shown between the branches of the bar B on the left-hand side of Fig. 1. The upper end of the shank 17 is provided with a cylindrical neck 19 to receive the slotted end of the fastener 20 for locking the beater in the hub 14 by turning the fastener into the position shown in Figs. 1 and 4. In Fig. 3 this fastener is turned back out of engagement with the neck of the shank in position to permit the beater to be pulled downwardly out of the said hub.

By our improvement the shaft-bearing bar is conveniently and efficiently attached to the top of the vessel, and the beater is readily attached and detached to and from the crank-hub and when attached is firmly held in place for being driven with the said hub.

We claim as our invention—

1. In a mixer, the combination of the vessel having a rim with the shaft-bearing bar having fixed hooks at one end, a sliding hooked plate at the other end, and a lever pivoted to the said bar and connected with the said sliding hooked plate by a pin-and-slot connection.

2. In a mixer, the combination of the vessel having a rim with the shaft-bearing bar having a pair of fixed hooks spread apart laterally beyond the side edges of the body of the said bar, a sliding hooked plate of a less width than the lateral spread of the said hooks, the said sliding plate being mounted on the said bar at the end opposite the said hooks, and means for moving and holding the said plate for binding the said hooks and hooked plate on the rim of the said vessel.

3. In a mixer, the combination of a shaft-bearing bar with the shaft-bearing mounted thereon, a hub mounted within the said bearing and having an axial opening therethrough of an angular form, the beater having a shank of corresponding form and fitted to the said opening in the said hub, the said shank having at its outer end a short neck and a fastening device pivoted on the said hub and having a slotted end for engaging the said neck.

4. In a mixer, the combination of the vessel having a rim with the shaft-bearing bar having fixed hooks at one end, a sliding hooked plate mounted within guides on the said bar at the end opposite the said hooks, and means for moving and holding the said hooked plate on the said bar for binding the bar on the said rim.

CLARENCE G. GARRIGUS.
ALONZO A. WARNER.

Witnesses:
S. R. MUNSON,
F. T. PUNDERSON.